May 5, 1964 J. H. LEMELSON Re. 25,570
EXTRUSION APPARATUS
Original Filed Oct. 22, 1957 3 Sheets-Sheet 1
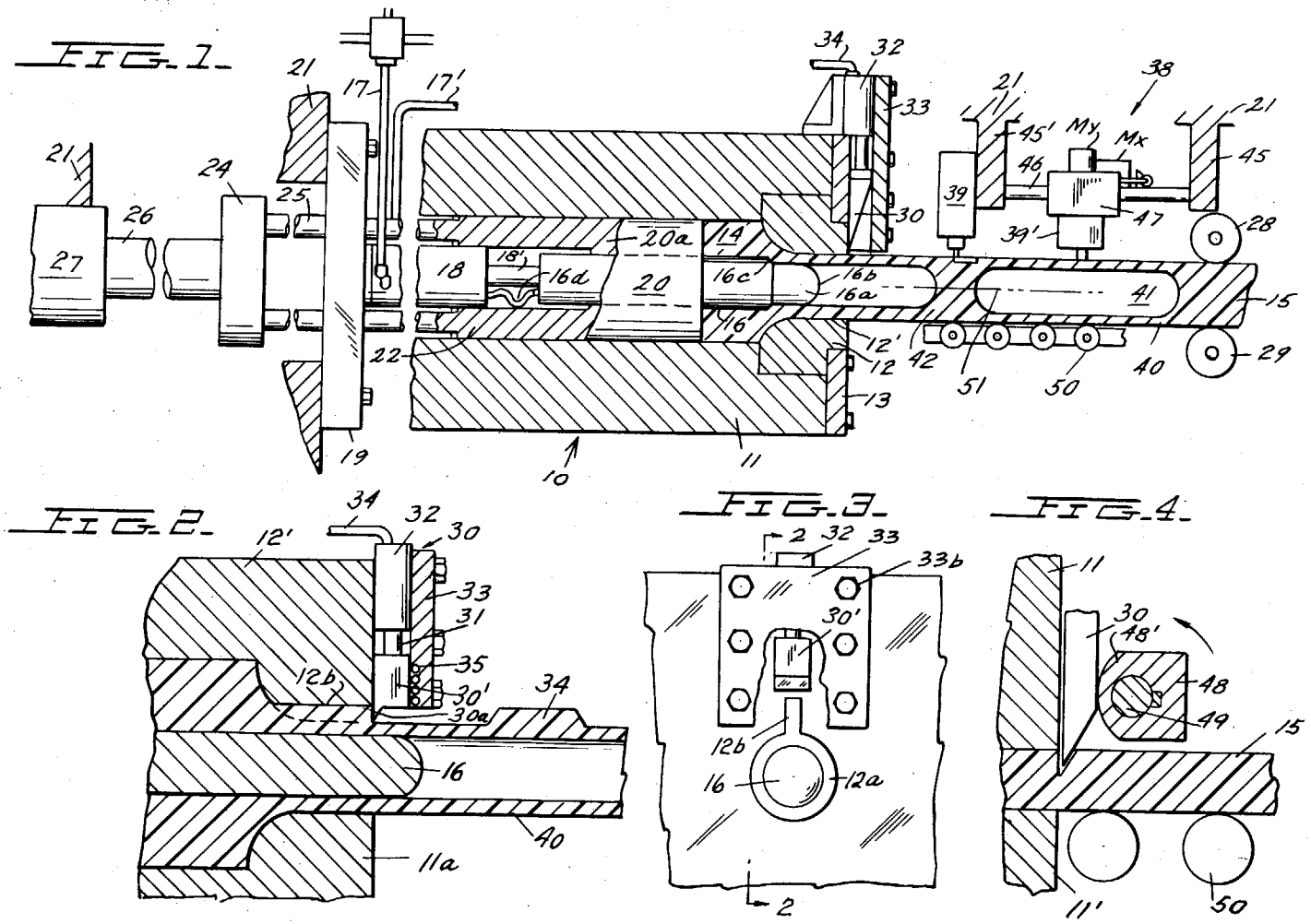

EXTRUSION APPARATUS
Original Filed Oct. 22, 1957 3 Sheets-Sheet 2
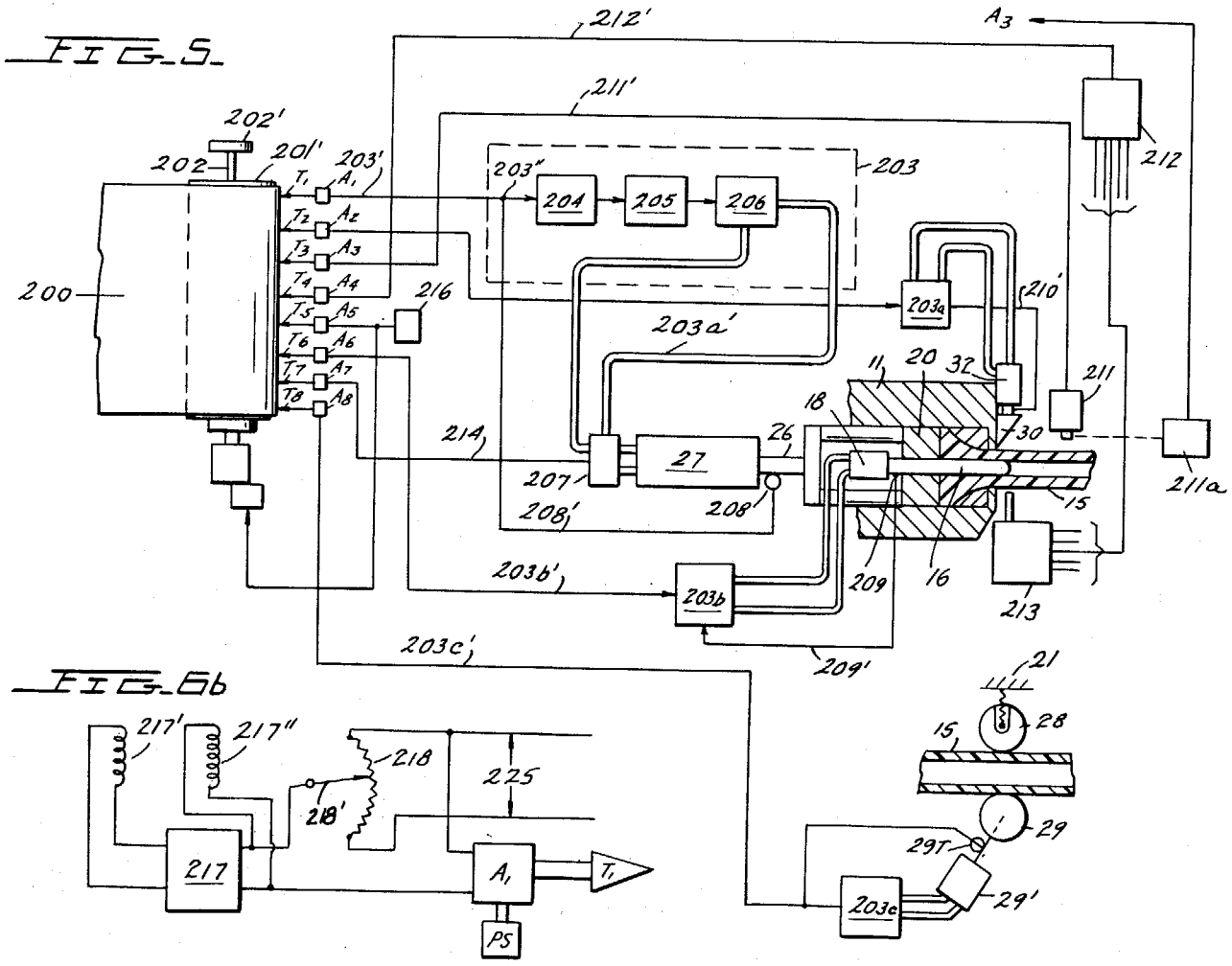

EXTRUSION APPARATUS

Original Filed Oct. 22, 1957 3 Sheets-Sheet 3

United States Patent Office

Re. 25,570
Reissued May 5, 1964

25,570
EXTRUSION APPARATUS

Jerome H. Lemelson, 8B Garfield Apartments, Metuchen, N.J.

Original No. 3,002,615, dated Oct. 3, 1961, Ser. No. 691,622, Oct. 22, 1957. Application for reissue Oct. 2, 1962, Ser. No. 228,223
18 Claims. (Cl. 18—12)

Matter enclosed in heavy brackets [ ] appears in the original patent but forms no part of this reissue specification; matter printed in italics indicates the additions made by reissue.

This invention relates to extrusion apparatus and in particular to automatic extrusion machinery for producing elongated extrusions which vary in cross section with length.

In general this invention relates to apparatus for extruding metal or plastics by a process which will hereafter be referred to as stop-extrusion which process involves machinery for effecting motion of one or more blades or stop extrusion tools over an extrusion die opening, or in and out of said die opening in a manner to change the cross-sectional shape of a member formed therein without the necessity of machining said member to effect said changes in shape. By controlling the motion of the stop-extrusion tool in degree as well as synchronizing its motion to occur at a predetermined time during an extrusion cycle, an elongated member such as a tube, beam, plate, rod or other structural shape may be provided having one or more integrally formed projections extending from said member at predetermined points along its length. Slots in its wall or changes in internal cross-section may also be provided at predetermined lengths of said extrusion which shape variations may eliminate one or more postforming or machining operations. A programmed automatic control system is provided for rapidly altering the sequencing as well as the degree of operation of the stop-extrusion means so that a product may be produced conforming to a particular order. As a result the set-up or sequential control means may be easily varied with minimum downtime required to produce another product thereafter conforming to other requirements.

Accordingly, it is a primary object of this invention to provide new and improved machinery for forming materials such as metals and plastics in a manner whereby one or more postforming operations are eliminated.

Another important object is to provide new and improved extrusion machinery for extruding material to shape which varies in cross-section with length.

Another object of this invention is to provide new and improved extrusion apparatus having means for automatically varying the shape of material expressing therefrom as it is formed and including automatic programming and control means for predetermining the points along said extrusion where said changes may occur as well as controlling the degree of said changes.

Another object is to provide improved means for controlling the extrusion rate as well as the operation of various tools for changing the shape or cross-section of an extrusion as it extrudes from a die.

Another object is to provide new and improved means for extruding tubing and other walled shapes with openings in the walls thereof of predetermined shape and length at predetermined sections of said tubing.

Another object is to provide an improved means for extruding and simultaneously working on such materials as thermoplastic plastics and metals.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention, as claimed.

FIG. 1 is a partly sectioned, partial side view of an extruding machine made in accordance with the teachings of this invention and also illustrating an extruded shape and means for forming said shape.

FIG. 2 is a fragmentary cross-section of a tubing extrusion press having means for varying the external shape of said tubing, with the cross-section being taken through line 2—2 of FIG. 3 looking in the direction of arrows 2—2;

FIG. 3 is an end view of FIG. 2 with parts broken away for clarity;

FIG. 4 is a partial view of the apparatus of FIG. 2 modified with means for supporting the means for varying the external shape of the tubing;

FIG. 5 is a schematic and block diagram of an automatic control system and apparatus of this invention controlled thereby.

FIG. 6b shows details of automatic control means applicable to the apparatus of FIG. 5.

Figure 6:
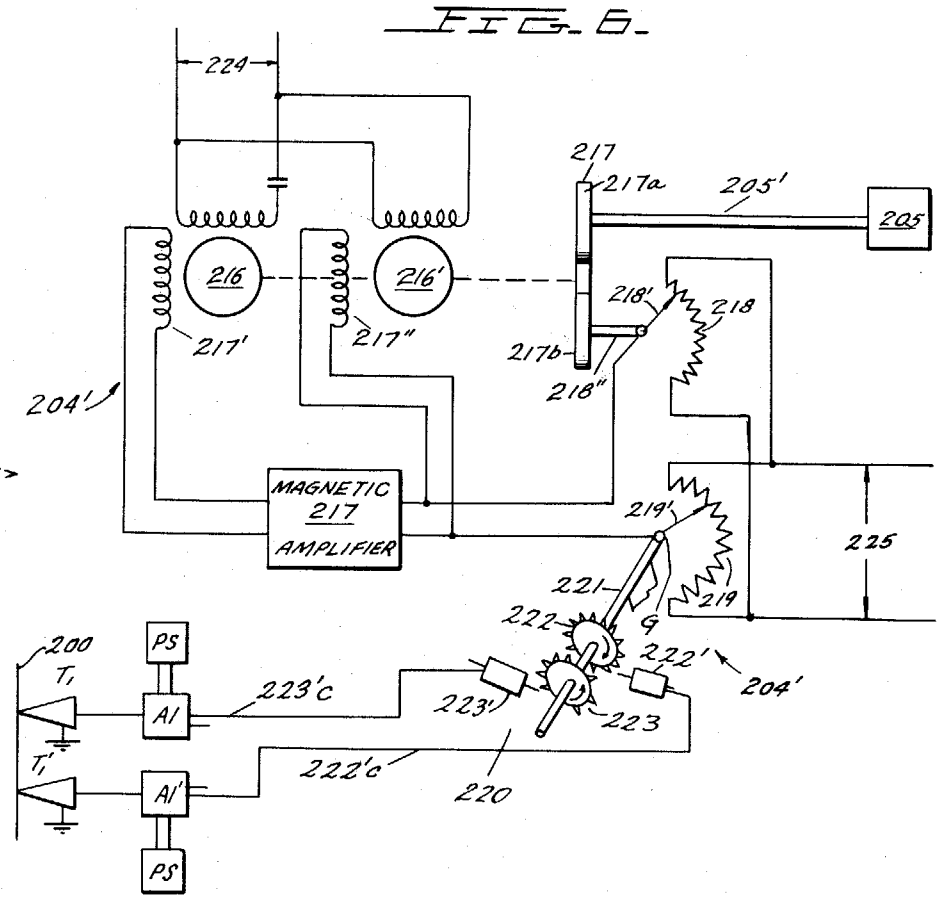
FIG. 6 shows a modified control diagram for apparatus of this invention employing a hydraulically operated servo and is applicable to FIG. 5.

FIG. 1 shows in partial cross-section details of an extrusion apparatus including an extrusion press 10 having a die section comprising a die chamber member 11 with a die 12 secured at one end of the chamber 14 and held by an end plate 13. The expressing of flowable material such as aluminum or plastic through the extruder is effected at room temperature by conventional pressure expressing means. In the apparatus of FIG. 1, a piston 20 travels longitudinally in the chamber 14 by the action of one or more hydraulic cylinders 27 one of which is shown with its ram 26 connected to the rear section 22 of piston 20 through two or more rods 25 and a yoke plate 24. The rods 25 travel axially in bearings in a base plate 19 secured to the frame 21 of the press. Said frame 21 also supports the piston prime moving cylinder 27. A mandrel 16 for forming the inside wall of the tubing is axially movable in a base 20a in the head end of the piston and is urged in reciprocating motion therein, so that its far end travels in and out of the bore of die block 12, by the ram 18' of a second hydraulic cylinder 18 secured to the bearing plate 19. Thus, as the piston 20 forces material out the opening in die 12 by movement towards said die, the smaller piston or mandrel 16 may be oscillated in the opening in said die at predetermined points in the extrusion cycle, a predetermined degree in a range of longitudinal positions from one in which only a solid rod section having the diameter of the die hole will be extruded, to a position whereby a tube is shaped having a wall with an inside diameter equal to the outside diameter of the mandrel in the opening in the die. Depending on the shape of the end of the mandrel over which the expressed material flows and the degree and manner in whch said mandrel is manipulated, tubing having a wall shape which varies in cross-section with length in a predetermined manner may be derived by automatic control of the mandrel's longitudinal motion and by controlling the speed of the ram of the hydraulic cylinder 18 by varying the pressure at the inlet and exhaust lines 17 and 17' to the cylinder of 18. The operation may be effected automatically and variations in the position of the tools and speed of operation of the servo which effects extrusion rate may be controlled to occur at predetermined times during the extrusion cycle to provide a tube or any elongated structural shape of predetermined cross-section change.

As an example, the cylindrical extruding member 15 is shown with one or more solid sections 42 provided at predetermined positions along the lengths of the tubular member. Manipulation of the mandrel 16 so that it projects far enough into the opening of the die 12 through which the material is expressing, will provide a shape which is equivalent in cross-section to the annular volume defined by the diametrical surface of mandrel 16a and the wall of the die opening. As the mandrel nose 16a is retracted by the action of cylinder 18 and moves backward into the chamber 14, since the nose 16a tapers or reduces in cross-section, the annular extrusion area through which material is permitted to extrude will increase and eventually a solid cross-section such as 42 will be formed in the extrusion which may extend for a predetermined length of the member 15 depending on the time the mandrel remains retracted during the extrusion process. Depending on the shape of the mandrel nose 16a and the degree said mandrel is moved in and out of the die opening, a variety of different internal cross-sections may be provided including sections having internal shelves, flanges, or plug-like formations such as 42 with or without enclosed or restricted openings such as 41 extending longitudinally therethrough. Automatic control of the degree of motion or position of the ram of cylinder 18 as well as the timing of such action may be effected by means of an automatic controller which may also be adapted to control the operation of cylinder 27 and the speed and degree of travel of piston 20. Other apparatus may also be controlled by the same controller for further finishing the extrusion and effecting a mark thereon or cutting off or otherwise shaping said extrusion. If the control means is properly timed and sequenced relative to the start of the extrusion cycle, a structural member or tube may be produced having internal changes in cross-section, such as the solid plug-like closure sections 42 at predetermined points in its length. If the locations of sections 42 of the member 15 are maintained and known, and it is later desired to perform further shaping operations at said sections, or to effect bends on the thinner wall sections 40 therebetween, said operations may be performed in another machine which is set up and sequenced to perform said operations using an end of a section of the member 15 as a reference point or bench mark. This assumes that the cutoff point of the extrusion 15 or the position at which a predetermined point in the extrusion begins or ends is known.

FIG. 1 also illustrates other apparatus which may be employed for further finishing operations on the member 15 as it is extruded. The notation 39 refers to a solenoid or fluid cylinder operated marking tool which may be controlled by said sequential or a feedback control means controlling the extrusion and mandrel operating cylinders to effect a mark or small indentation in the outer surface of the member 15 at each of the solid cross-section sections 42 to indicate their positions for indicating where to perform operations such as drilling, bending, cutting, etc. The notation 50 refers to a roller conveyor or the like for supporting the member 15 as it extrudes and preventing its deformation due to the forces applied by tool 39. The tool 39 may also be a drill or punching tool for partly or completely penetrating and providing a hole or cavity in the sections 42 or the thin walled sections 40 between said solid plug sections. While 39 is shown secured to part of the frame or mount 21 for the press, it may also be mounted on a carriage such as 47 which is movable when actuated in the direction of extrusion and is adapted to move at the same rate as the member 15 to serve as a so-called flying mount for the tool 39 so that said tool may perform an operation on 15 while fixed relative to said extruding member.

The notation 32 refers to a hydraulic cylinder mounted on the end of the die chamber 11 which is adapted to project a blade or tool 30 against 15 to reduce the cross-section thereof. The tool or blade 30 may also pertain to a shear for cutting of the member 15 into predetermined lengths and is preferably under the control of the means for automatically controlling the other servos. The numerals 28 and 29 refer to a pair of rollers, one of which is power operated, which may be utilized for further guiding and driving the member 15 away from the chamber 11 after cutoff.

Cutoff may also be effected by stepping the mandrel in shape as at 16c. When 16c is moved into the constant diameter section of the die opening 12', it acts as the plunger of a valve and is shaped to reduce the annular extrusion area when projected to or near zero clearance so that said extrusion is stopped or the wall 40 is made so thin that simple means may be employed to part the member 15.

In order to effect the formation of the solid plug section 42 without reducing the speed at which the member 15 is extruding, it will be necessary to increase the rate of travel of the piston 20 so that the extrusion material rate of flow will increase during the period it is shaped into section 42. An increase in the rate of travel of said piston may also be required, depending on the characteristics of the material being extruded, to prevent buckling of the thin wall 40 as 16 is withdrawn. The changes in speed of travel of piston 20 may be effected automatically by means of a predetermining controller which also controls all the servos employed.

If a plastic or material other than metal is utilized as the expressing material, the conventional screw conveyor extrusion means may be employed in place of the piston 20 and the rate of flow of the expressing material may be controlled by controlling the rate of rotation of the screw.

FIGS. 2 and 3 show the extrusion apparatus of FIG. 1 modified with means for varying the external shape of tubing or structural member extruded therefrom. The apparatus will produce tubing having one or more shelves or flanges of predetermined length projecting at predetermined sections along said extrusion which may be used for strengthening or stiffening said tubing, to effect improved and simplified fastening of said extrusion to other members and for other functions.

In FIGS. 2 and 3 the die 12' is shown as having a through and through hole of irregular shape comprising a section 12a which is circular in cross-section and a radially extending opening portion 12b in the shape of a slot for the formation of an elongated extrusion with a ridge or shelf 34 projecting from the section extruded through 12a. A stop-gate 30 is mounted adjacent the end of die 12' which comprises a tool 30' of hardened metal with a bevelled nose 30a adapted to slidably engage the face 11a of the die block and to be urged by a ram 31 of a hydraulic cylinder 32 to cover and uncover the end of the projecting section 12b of the hole in the die 12'. Thus, if tool 30' is moved radially across and away from opening 12b as material is extruded through said die, one or more of the formations 34 may be provided projecting from the surface of the extrusion 15. The length and position of a formation 34 will be a function of the time during which extrusion tool 30' is positioned over the section 12b of the die hole and the amount of time it remains covering said section. The numeral 33 refers to a support for the tool 30' between which and the face 11a of the die block, said tool is slidably engaged. Support 33 is preferably bolted to the die block 11 as is the cylinder 32. A lineal ball bearing 35 may be secured to the block 33 to bear against the tool blade 30' to reduce friction and facilitate movement of the tool across and radially away from the opening 12b.

FIG. 4 shows apparatus for urging one or more stop extrusion blades 30' in forced engagement against the face of the die or extruder housing in which said blade is supported against deflection. The mechanism of FIG. 4 may be used where the material being extruded has a tendency to flow between the face of the die, or extruder, and the blade, when the latter is advanced over all or part of the opening, thus resulting in an undesirable material leak which may affect the shape of the extrusion. In FIG. 4, the blade 30' is first driven against the extruding material stopping off part of the flow, as shown, to change the shape of the extrusion. A cam 48 mounted on a shaft 49 is then rotated by the action of a servo (not shown) which causes a surface 48' of the cam to engage the outer surface of the blade 30' and urge or force said blade against the face 11' of the die or extruder front wall, thereby effecting a seal between said blade and 11'. When 48 is again rotated clockwise, it disengages 30' allowing the latter to be withdrawn from the die opening. The operation of the servo advancing and retracting the blade may be interlocked with and synchronized to occur prior to and after the respective locking and unlocking actions of the cam 48. The shaft 49 of cam 48 is preferably supported by bearings secured to the extruder 11 or the frame 21 therefor so that its position remains fixed relative to the face of 11.

FIG. 5 illustrates programming and automatic control means for controlling the extrusion apparatus of FIGS. 1 to 4 or the like. In the diagram, as well as in the others employing electrical control means, it is assumed that, where not illustrated, the proper power supplies are provided on the correct sides of all switches, controls, amplifiers, etc. Where illustrated, the notation P.S. refers to a power supply.

As requirement for the length and position of cross-sectional changes in the extrusion such as the internal plug-like sections 42 and/or the location and length of externally extending lugs such as 34, or cutouts, slots or indentations formed by stop tools such as 30 of FIGS. 1 and 4, may vary from one production run or order to the next, it is desirable that means be provided for rapidly and easily changing the sequential control means for controlling the degree and direction of movement of the various tools such as mandrel 16 as well as the speed and direction of motion of the extrusion piston 20. Other servo means which may be desirably synchronized or interlocked to the movement of the mandrel 16 and piston 20 include the servo means for advancing and retracting the stop tool 30, which servo may also be controlled in speed and position, the servo means for operating the cut-off tool for severing predetermined lengths of the extrusion from the material expressing from the die, the servo means for operating the marking tool 39 for indicating the positions of variations in internal shape by providing marks on the outside of the tube. It may also be required to control the speed of the powered rollers used for drawing or conveying the extrusion away from the extruder before and/or after severance of a length thereof from the expressing material. The sequential control may also be provided for such auxiliary apparatus as a valve or valves for effecting the flow of a fluid through the mandrel to provide a fluid in the chamber or chambers 41 for encapsulation of said fluid therein, and or other auxiliary machining equipment such as described operations on the extruding or extruded sections.

In FIG. 5, automatic sequential control of the various servo components of an automatic extrusion system utilizing one or more of the described devices for varying or operating on a section of material as it expresses from an extrusion machine, is effected by reproducing and utilizing signals recorded in a predetermined order on the surface of a magnetic drum or tape 200 moving at constant velocity or intermittently moved past multiple reproduction transducer heads $T_1$ to $T_7$. A constant speed controlled motor 201 drives the shaft 202 of a pulley or drum 201' driving a closed loop magnetic tape 200, which tape has command signals recorded on respective tracks thereof to effect a predetermined sequence of actions. While the complete tape transport is not shown, means are preferably provided for rapidly changing the closed loop tape 30 or erasing the signals recorded thereon and recording new signals so that the sequence and type of operations performed on predetermined lengths of the member 15 extruded from the extrusion press 11 may be rapidly altered with negligible downtime required to effect said change.

In FIG. 5 control of the lineal servo devices 18 and 27 which respectively control the degree of movement and speed of the mandrel 16 and the extrusion piston 20, is effected by means of an electro-hydraulic pump servo system. Illustrated, although not necessarily limited thereto, is a two-way variable displacement hydraulic pump used in a closed loop system with an electro-hydraulic stroker which varies pump delivery rate in proportion to a low level electrical input signal. Such a pump and control system therefore, is described in the April 1957 issue of Control Engineering Magazine.

Two means for effecting automatic control using electro-hydraulic pump servos are provided. In FIG. 5, one or more analog signals of varying amplitude are recorded on respective channels of the magnetic tape 200 and are each reproducible to provide a time variable voltage which is used to control an electric stroker 204 which in turn controls the position of a slide block of a variable displacement hydraulic pump 206 through a hydraulic stroker 205. The block notation 203 refers to the combination of the electric stroker 204, input thereto, hydraulic stroker 205, and hydraulic pump 206 and the other reference notations for blocks 203a, 203b, etc., are assumed to contain components similar to those provided in 203 for controlling other servos or hydraulic cylinders as described. The characteristics of the variable displacement hydraulic pump 206 are such that, depending on the position of the slide block thereof, which is controlled by the electro-hydraulic stroker, it may pump in either direction and hence the position as well as the direction of motion of the ram of the hydraulic cylinder controlled thereby will be a function of the amplitude of the analog signal recorded on the channel of 200 controlling said servo or the voltage input to the electric stroker.

The feed-back loop of the system 203, which controls the position and direction of motion of the ram 26 of cylinder 27 and hence the motion of the extrusion piston 20, includes a potentiometer 208 having a wiper arm which is coupled, via gears or the like, to the movement of ram shaft 26. Hence, the value of the resistance of 208 is a function of the position of 26 and the piston 20. The command signal voltage is reproduced by pick-up transducer $T_1$ reproducing the analog signal from 200, which is amplified by linear amplifier $A_1$ and is ed as a proportional voltage signal to the input 203″ f controller 203. The notation 203″ may represent a evice such as a voltage comparator of known design, hich is adapted to provide an error signal or a sum-ing amplifier, the inputs of which are connected to eceive the variable voltage signals from 208 and $A_1$. he output of the summing amplifier 203″ is used to ontrol the electric stroker 204. Said output or error ignal voltage drives the motor of the electric stroker 04 until the output of the feed-back potentiometer 208 quals the voltage output of $A_1$. The electric stroker otor in turn controls a valve plunger through precision earing and hence effects control of the hydraulic stroker 05. Thus, depending on the characteristics or rate of hange of amplitude of the signal recorded on the chan-el of 200 from which $T_1$ is reproducing, the piston 20 ay not only be controlled in position but its speed nd rate of change of speed may be controlled and aried according to the described requirements for in-reasing or decreasing the flow of material through the ie as the mandrel 16 is moved relative thereto and ates different flows therethrough to change the internal ross-section of the extrusion. In a similar manner, the ydraulic cylinders 18 and 32 controlling the mandrel iston 16 and stop blade 30 may be controlled by means f the control systems 203a and 203b, each of which eceives a variable voltage input over the circuits 203a′ nd 203b′ which connects to respective amplifiers in the utputs of respective reproduction transducers which eproduce respective control signals from respective chan-els of tape 200. If multiple stop-extrusion blades are rovided in a side by side array, for controlling width r formations on a wide extrusion, then each may be ontrolled by separate units 203a if positional control f said blades is desired, or merely by valving fluid to ither side of the piston controlling the blade if the only ontrol required as to advance the blade and retract it t predetermined positions in the cycle. Such control ay be effected by the use of monostable solenoid valves or gating fluid under pressure from a reservoir to pump either side of the piston of the cylinder 32 for con-olling the projection or retraction of said blade. The olenoid valve or valves, which may occupy the positions f 203a or 203b of FIG. 5, may be controlled to switch om a position whereby the stop tool is retracted to an dvanced or projecting position such that the shape of e extruding member is changed when a signal of the equired amplitude is reproduced from the respective ack of 200 and this signal is used as an actuating volt-ge for energizing the solenoid field coil. The lack of signal at a monostable solenoid will cause it to retract us switching the valve to the other position and revers-g the flow of the pressurized fluid to the cylinder con-olled thereby, whereby to cause the piston ram to return its other position.

FIG. 5 also illustrates the use of pulse or signal actu-ed switches or solenoids to effect such actions of amping, cutting, filling, and the like. The line 209′ efers to a circuit including a feed-back potentiometer 09 similar to 208 which operates off the shaft of man-rel 16. Potentiometer 209 provides a voltage indica-ve of the position of the mandrel 16 in the extrusion amber or die, said potentiometer 209 being connected a comparator in 203b for providing an error signal s its output by comparison of said feed-back signal ith the command voltage transmitted from amplifier $_6$ over line 203b′. Said error signal is used to control e operation of piston 20. The line 210′ functions in similar manner and connects a feed-back potentiometer easuring the stroke or position of the blade 30 with s input to a comparator in 203a. Pulse signals repro-uced by the pick-up head $T_3$ are amplified and trans-itted over circuit 211′ to momentarily energize a sole-oid for operating the marking or forming tool 211′ hich advances against the extruding member 15 at pre-determined intervals in the extrusion cycle and may be used to externally shape or otherwise to indicate, where specific changes in internal cross-section occur along the extrusion.

The device referred to by numeral 211 may also comprise any lineally actuated device for operating on and withdrawing from the extruding member 15. It, 211, may also be a straightening tool, clamp, punch, milling cutter or forming tool which may also be actuated to operate on the extrusion after the piston 20 has been temporarily stopped as the result of the generation of the proper command voltage which results in the movement of the slide block of the variable displacement pump to a center or neutral position whereby no fluid is delivered to either of the ports of cylinder 27.

The notation 213 pertains to a sequentially controlled device for operating on the extrusion 15 while it is in motion. The tool 213 may comprise, for example, such devices as a flying bed press, flying shear or flying saw mounted whereby it may be advanced against the extrusion, move a brief distance therewith as it extrudes at the speed of extrusion while operating thereon after which it retracts and returns to a starting position from which it is thereafter again actuated. The motors for powering the member 213 for operating on the work and for advancing it against the work and moving it at constant speed with the work, may be controlled by a multi-circuit timer 212 which is self-resetting and is initially energized by a pulse input thereto generated on input line 212′ after its reproduction from the tape 200. Said motors may also be controlled by variable signals recorded on 200 in the manner described.

Also shown in FIG. 5 is a means for effecting control of speed of the powered roller 29 of FIG. 1 for guiding and driving the extrusion 15, or a segment cut therefrom away from the press 11. A controller 203c, having similar components to those of 203, is provided for controlling the speed of a motor 29′ which drives roller 29 in coacting with one or more depressor rolls 28 to effect movement of the extrusion. A closed loop speed control system is provided in which the output speed of motor 29′ is measured by a feed-back tachometer 29T driven by the shaft of 29′ which follows the speed command voltage resulting from the amplification of a signal reproduced by a transducer $T_8$ from a channel tape 200 which signal is of such a nature and that the speed of said drive rolls will vary in proportion to the rate of travel of the extruding member. The means for effecting control and variation of the speed of the drive rolls comprises the reproduction of a recorded speed command signal by $T_8$ which is utilized for effecting speed control.

The reference numeral 211a′ refers to a linear servo such as a solenoid or solenoid actuated ram operated by a signal from a respective transducer for urging the cam-lock 48 of FIG. 4 against the stop blade 30 to effect its sealing engagement with the die as described. If 211a is a servo such as a monostable solenoid, the presence of a signal reproduced from 200 at its input will cause cam 48 to bear against 30 whereas the cessation of generation of said signal will cause 48 to retract from 30.

FIG. 6 shows schematically apparatus for controlling the hydraulic servo devices heretofore described by means of signals reproduced from a tape which serve to program a cycle of actions while controlling said servos. An electrical stroker 204′ is operated by pulse signals reproduced from recording tape 200. The electrical stroker 204′ includes a command potentiometer 219 and a feed-back potentiometer 218, the resistance elements of which are connected across a power supply line 225. The wiper arm 218′ of feed-back pot 218 is rotated by a shaft 218″ which is geared to the rotation of the shaft 205′ of the hydraulic force stroker 205 which is driven by the shaft of the electric stroker motor 216. A tachometer 216′, coupled to the shaft of motor 216, is used for stabilization. The notation 224 refers to a source of reference voltage across the stator coils of motor 216 and tachometer 216′. The error signal or difference between the value of the command potentiometer 219 and feed-back potentiometer, is fed to a magnetic amplifier 217 which amplifies and applies a control voltage to the coil 217′ of motor 216. The wiper 219′ of the command potentiometer is positioned by the shaft 221 of a servo device 220 to give the pot 219 a value in accordance with the characteristics of the signals recorded on the tape 200. The servo 220 comprises a pair of ratchet and pawl mechanisms 222 and 223 each adapted to effect rotation of said shaft a degree or unit angle in a respective direction when their respective solenoids 222′ and 223′ are energized. When the monostable solenoid 222′ is energized by a pulse reproduced by a transducer $T_1'$ from a first channel of the tape 200, the plunger of said solenoid actuates the ratchet pawl mechanism 222 rotating shaft 221 a unit of rotation counterclockwise thereby rotating wiper arm 219′ a unit angle clockwise through gears G. When solenoid 223′ is energized by a pulse reproduced from another channel of 200 by head $T_1$, the shaft 221 and hence 219′ rotates in the opposite direction.

Control is thus effected by recording groups or trains of pulses along predetermined sections of each recording track of 200 and using these to effect a predetermined movement or pre-positioning of one or more of said hydraulic servos. The length of each pulse train (i.e. the number of pulses in the train), will determine the degree of movement of the servo. The position of the pulse train, relative to the other recorded signals, will determine the timing or sequencing of the particular action, in the extrusion cycle. Control of the speed of movement of the servo may also be effected by the spacing of the pulses in the particular train. The closer the spacing of pulses, the faster shaft 221 will be stepped by the respective solenoid. The electric stroker will thus position the hydraulic stroker more rapidly and the pump will attain its commanded speed more rapidly. Thus, the servo operated thereby will move to or seek its commanded position more rapidly. By providing a pulse train in which each pulse is spaced from the next at an increasing or decreasing distance in the direction they are reproduced from 200, the rate of change of velocity or acceleration of the tool may be varied. Thus, depending on the response of the motor of the electric stroker in nulling the error signal, any predetermined position, speed, velocity or acceleration of the servo and tool may be attained by controlling the number, position and spacing of the pulses recorded on the magnetic recording member 200. It is noted that a punched tape and conventional finger limit switch or photocell reading means may also be employed in place of the magnetic tape or drum 200.

Also, as the pump 206 may also be utilized to control the action of a rotary hydraulic servo or fluid motor, such servos may be used and controlled by the pulse system described, to operate and control devices for operating on the extruding member. Control of the speed or number of rotations of the drive rolls 28 and 29 may also be effected with the described control arrangement, for urging the extrusion out of the extruder. The feed-back tachometer 29T is provided in FIG. 5 for speed control means, if such control is necessary.

Figure 6A:
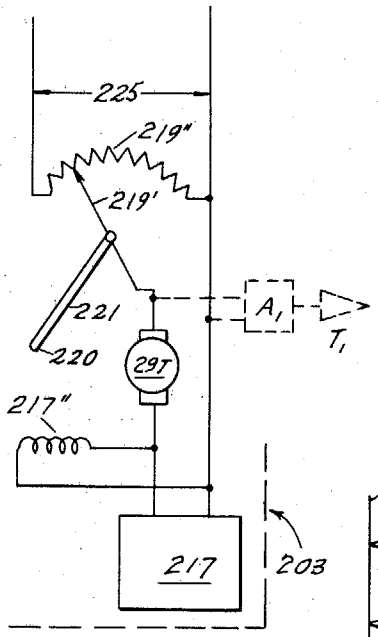
FIG. 6a shows a modified form of control applicable to replace certain components in FIG. 6

FIG. 6a shows means for effecting speed control of such servos as the ram cylinder 27 or the motor 29′ powering the drive roller 29 which coacts with 28 to urge the extrusion 15 from the extruder. An output-speed feed-back tachometer 29T is shown connected in series with the wiper arm 219′ of a command potentiometer 219″, which may be controlled in the same manner as the wiper of FIG. 6. Tachometer 29T is also connected to the magnetic amplifier 217 and is in parallel circuit with the coil 217″ of the stroker feed-back tachometer 216′. The inner position loop of the electric stroker is left out to obtain an integration from the stroker. The pulse or signal controlled shaft 221 controls the wiper 219′ or 219″ as described to provide a variable speed command voltage in accordance with a signal or signals recorded on the tape 200. It is noted that the control means of FIG. 6 may also be used to provide a form of speed control, since the rate of change of position of the shaft 205′ and hence the rate of variation of the output of the pump 205 which is directly related to the speed of the servo driven thereby, is a function of the rate at which the potentiometer 219 is varied, which variation depends on the number and spacing or rate of reproduction of the command pulses used for varying the position of wiper arm 219′. If an analog or variable amplitude signal recorded on a channel of the tape 200 is used as a source of variable command voltage by utilizing a linear reproduction amplifier $A_1$, the output of said amplifier may be connected as illustrated in FIG. 6a whereby the rate of change of amplitude of the recorded analog signal will produce a variable voltage for controlling the electric stroker motor resulting in a corresponding acceleration. In other words, the acceleration of the controlled servo will be a function of the rate of change of the reproduced signals amplitude. Thus, a predetermined variation in output speed and acceleration may be provided to occur at a predetermined time during the extrusion cycle for effecting predetermined volume flow, drive and/or movement of one or more of the illustrated servos or stop extrusion means.

FIG. 6b is a schematic diagram showing details of the analog signal control means referred to in FIG. 5 for controlling the output of the variable displacement pump 206 which controls the motion of the hydraulic servo 27. This arrangement may also be used for controlling the other servos of the extrusion apparatus such as those driving the tools, mandrel, conveying means, etc., which require positional as well as speed control. The reproduction head $T_1$ reproduces the analog signal recorded on its track. Said signal is amplified in the linear amplifier $A_1$ and provided on its output as a predetermined command voltage proportional to the amplitude of the recorded signal. This command voltage is compared with the output voltage of the feed-back potentiometer 218 which is connected as in FIG. 6 by the gearing to the shaft of the electrical stroker motor. The error signal voltage is amplified in the magnetic amplifier 217 and drives the stroker motor until the value of 218 and the output of $A_1$ are equal. In FIG. 6b and in the other drawings where provided, the notation P.S. refers to a power supply.

In the foregoing, I have described my invention only in connection with preferred embodiments thereof. Many variations and modifications of the principles of my invention within the scope of the description herein are obvious. Accordingly, I prefer to be bound not by the specific disclosure herein, but only by the appending claims.

I claim:

1. In an automatic control system the combination of a positional device operated by a hydraulic servo, control means for said hydraulic servo adapted to control the movement of said positional device including control of the speed and predetermining of the position thereof in relation to the operation of further servo means to effect a synchronized operation thereof, said hydraulic servo being operatively connected to a variable displacement hydraulic pump, the displacement of said pump being variable by a hydraulic stroker operated by an electric stroker coupled to the valve plunger thereof thru precision gearing and having a feedback signal generating means for stabilization, closed loop feedback means in addition to said feedback signal generating means for indicating by an electrical signal the position of said positional device, a source of a variable command voltage which varies in a predetermined manner in relation to further command signals for controlling said further servo means, said source of variable command voltage being provided by recording an analog signal on a first track of a recording medium adapted to be driven at a constant speed past means for reproducing said signal, a linear amplifier in the output of said analog signal reproduction means adapted to amplify and provide a voltage signal over an output circuit which is a function of the signal recorded on said recording medium, the output of said linear amplifier being connected to an input of a comparator adapted also to receive said position indicating feedback electrical signal and to provide an error signal, which is the difference between said two signals, over an output circuit for controlling said electric stroker, said comparator being a summing amplifier, the input to said electric stroker from said summing amplifier including means for amplifying said error signal and controlling a motor thereby, said electric stroker having a shaft output for driving said hydraulic stroker until the voltage of said feedback means equals the command voltage produced by reproduction of said signal recorded on said recording medium, said electric stroker thereby changing the position of said hydraulic stroker and varying the delivery of said pump in proportion to the variation in said recorded signal whereby the speed of movement and the position of said positional device may be controlled and varied in a predetermined manner to effect a predetermined action.

2. Extrusion apparatus comprising in combination, an extrusion die having an opening therethru communicating with an extrusion chamber of an extrusion machine, a minimal area portion of said opening defining an extrusion throat in said die, an automatically controlled servo operated means for varying the area of the throat of said opening, said throat defining an area in which a material extruded thru said opening is normally formed to shape which shape it normally retains thereafter, a plurality of prime movers for moving an extrusion material through said apparatus, said prime movers being operative to vary in the speed of their operation by respective electrically controlled servo means, a variable programming means operatively connected to controls for each of said servo means, said programming means including means for generating a plurality of control signals each during a predetermined time in an extrusion cycle and each adapted to control respective of said servo means to effect a predetermined variation in the area of the throat of said die opening and corresponding change in the speed of operation of at least one of said prime movers of said material whereby the velocity of the material controlled by said prime mover varies in proportion to the change in area of said throat.

3. Extrusion apparatus comprising in combination, an extrusion die having an opening therethrough communicating with an extrusion chamber of an extrusion machine, a minimal area portion of said opening defining an extrusion throat in said die, an electrically controlled servo operated means for varying the area of the throat of said opening, said throat defining an area in which a material extruded thru said opening is normally formed to shape which shape it may normally retain thereafter, a plurality of prime movers driven by respective servo means for moving an extrusion material through said apparatus, said prime movers including a means for delivering an extrusion material to said extrusion die under sufficient pressure and mass flow to cause it to be extruded through said die in a cross sectional shape equivalent to the area of said throat, a second material moving means situated beyond said die for engaging the material shaped in said die and conveying it away from said die, said prime movers being operative to vary in the speed of their operation by respective electrically controlled servo means, a variable programming means operatively connected to controls for each of said servo means, said programming means including means for generating a plurality of control signals each during a predetermined time in the extrusion cycle and each adapted to control respective of said servo means to effect a predetermined variation in the area in the throat of said die opening and predetermined changes in the operation of said prime movers for said material whereby the extruded shape varies in a predetermined manner with its length and the flow of material into and out of said die is continuous and varies proportionately.

4. Extrusion apparatus in accordance with claim 3, said programming means including means for infinitely varying the speed of both said prime movers for said material within a given range and infinitely varying the operation of the servo for varying the area of the throat of the die opening whereby the velocity of flow of material entering and leaving said die may be regulated in accordance with the change in area of said throat to maintain the material completely filling the extrusion area of the throat.

5. Extrusion apparatus in accordance with claim 3, said programming means comprising a magnetic recording means with means for driving said recording means past a plurality of reproduction transducers for reproducing signals recorded on respective channels thereof, the output of each of said transducers being operatively connected to a control for a respective of said servos for control thereof, said programming means adapted to effect the generation of signals on each of said transducer outputs in predetermined time relation to the generation of signals on the outputs of the others to synchronize the operation of said servos and to define an extrusion cycle for extruding a shape of predetermined varying cross section.

6. Extrusion apparatus in accordance with claim 5 including a comparator means operatively connected to one of said transducers, the channel of said magnetic recording means from which the comparator means coupled transducer reproduces having an analog signal recorded thereon along a predetermined length of said magnetic recording means, said comparator means adapted for controlling at least one of said servos by utilizing the reproduced analog signal, said comparator having a signal input from a transducer which provides a feedback signal with the movement of the servo, said comparator including means for using said feedback signal and the signal reproduced from said magnetic recording means to attain a predetermined null condition in the operation of the apparatus controlled by the servo.

7. Extrusion apparatus in accordance with claim 6, at least one of the servos being operatively connected to a stop-extrusion tool which is adapted to be infinitely adjustable in position within a given range across the throat of said die, said feedback signal being derived from a transducer the output of which varies with the position of said stop extrusion tool whereby the position of said tool and variations in its rate of travel may be controlled and varied in a predetermined manner to provide infinite variations in the shape of the extrusion defined in part by the movement of said tool.

8. Extrusion apparatus in accordance with claim 7, said stop extrusion tool comprising a blade mounted on said apparatus, said blade being movable across the throat of said die in sealing engagement with the face of the die opening, whereby the cross sectional area of the throat is changed and is defined at least in part by the edge of the blade projecting across the throat.

9. Extrusion apparatus in accordance with claim 7, said stop extrusion tool comprising a mandrel which varies in cross section along its length, said mandrel being axially movable thru the throat of said die opening a degree to vary the volume exterior of said mandrel and the wall of the throat may be varied to effect a change in the cross section of the extrusion and an infinite number of extruded shapes may be produced.

10. Extrusion apparatus in accordance with claim 2, said apparatus including a further electrically controlled servo-operated tool located beyond said extrusion die adjacent material extruding therefrom for performing a further operation on the finished extrusion, a control for said further servo-operated tool servo which is operatively connected to said variable programming means and is adapted to be energized thereby during a predetermined time in the extrusion cycle to engage and perform an operation on a predetermined section of the extrusion.

11. Extrusion apparatus in accordance with claim 9 said mandrel being retractable from the throat of said die opening a degree whereby an extrusion may be formed therein and being movable into said throat to permit the formation of a hollow tubular shape, said programming means including means for operating the servo of the material prime moving means to increase the flow of material to said die during the retraction of the mandrel whereby a solid portion of an extrusion is produced, and means for operating the material prime moving servo to reduce the flow of material to said die when the mandrel is advanced and a hollow tubular extrusion is being produced.

12. Extrusion apparatus in accordance with claim 11 said mandrel having an opening therein, a servo operated means for feeding a second material thru said opening, said programming means including means for effecting the formation of an extrusion consisting of a plurality of solid portions with tubular portions extending for predetermined lengths of the extrusion between solid portions, said programming means also including means for controlling said servo feeding said second material to deliver a predetermined quantity of a fluid into the volumes defined by the tubular portions of the extrusion before the formation of the solid portion closing said volume.

13. In an automatic extrusion apparatus as described, a system for controlling the operation of said apparatus comprising in combination, an extrusion tool which is movable to vary the cross section of the throat of an extrusion die to change the cross-sectional shape of a material expressing therefrom, said tool being operable by a hydraulic servo for controlling the speed and position of said tool in relation to the operation of an extrusion material prime moving means which is operated by a further servo whereby the two servos are synchronized in their operation, said hydraulic servo being operatively connected to a variable displacement hydraulic pump which is operated by a hydraulic stoker, said hydraulic stroker being operated by an electric stroker which has a feedback signal generating means for stabilization, a further feedback signal generating means for indicating the position of said tool, a source of variable command voltage which varies in a predetermined manner in relation to further control signals generated for controlling the operation of said material prime moving servo, said source of variable command voltage provided by reproducing an analog signal from a first channel of a magnetic recording medium which is driven at constnt speed past reproduction transducing means, a linear amplifier in the output of the reproducing means for said analog signal, adapted to amplify and provide on its output circuit a voltage signal which is a function of the signal recorded on said magnetic recording medium, the output of said linear amplifier being connected to the input of a comparator which is adapted to also receive the signal generated by said further feedback position indicating signal generating means, said comparator adapted to provide an error signal which is the difference between said two signals, means for controlling a servo operating said electric stoker with said error signal until the voltage generated by the tool position indicating signal generating means equals the voltage derived from reproducing said recorded analog signal, said electric stroker thereby changing the position of said hydraulic stroker and varying the delivery of said hydraulic pump in proportion to the variation in the recorded analog signal whereby the speed of movement and the position of said tool is controlled in a predetermined manner and varied to provide an extrusion of a predetermined shape which varies with length.

14. In an automatic control system the combination of a positional device operated by a hydraulic servo, control means for said hydraulic servo adapted to operate said servo in a manner to control the speed of movement and position of said positional device in synchronized relation to the operation of a further servo driven device, said hydraulic servo being operatively connected to a variable displacement hydraulic pump the displacement of said pump being variable by a hydraulic stroker which is operated by an electric stroker having a feedback signal generating means for stabilization, a further feedback signal generating means adapted for indicating by an electrical signal the position of said positional device, means for generating a first command signal which varies in a predetermined manner in relation to further signals for controlling said further servo driven device, said first command signal generating means comprising in combination with a magnetic recording medium, a means for driving said magnetic recording medium at constant speed past a transducing means for the repetitive playback of a variable control signal recorded thereon, the reproduction of said variable control signal from said magnetic recording medium being transmitted to a linear amplifier the output of which is operatively connected to a comparator which is also adapted to receive signals from said further feedback signal generating means and to provide on its output an error signal which is the difference between the two received signals, means for amplifying said error signal and using it to control the servo operating said electric stroker which in turn drives said hydraulic stroker until the error signal disappears, said electric stroker thereby changing the position of said hydraulic stroker and varying the delivery of said pump in proportion to the variation in the recorded signal whereby the speed of movement and position of the positional device may be controlled and varied in a predetermined manner to effect a predetermined action.

15. Extrusion apparatus comprising an extrusion machine having an extrusion chamber, a die having an opening therethrough communicating with said chamber, said opening having a minimal area portion defining an extrusion throat of said die, an automatically controlled servo operated means for varying the area of said throat, said throat defining an area in which material extruded through said opening is normally formed to shape with this shape normally being retained thereafter, prime moving means for moving an extrusion material through said apparatus, controls for said servo operated means, programming means connected to operate said controls, said programming means including means for generating a programmed sequence during a predetermined time in an extrusion cycle and adapted to control operation of said servo operated means to effect a predetermined variation in the area of the throat coordinated with speed of the prime moving means whereby the shape of the extrusion is varied along its length in a predetermined manner.

16. The apparatus set forth in claim 15 also comprising controlled servo means operatively connected to control the speed of the prime moving means, controls for the controlled servo means, programming means connected to operate said last recited controls, said last recited programming means including means for generating a programmed sequence coordinated with the previously recited programmed sequence, whereby operation of the prime moving means varies in a predetermined manner proportional to the change in area of the extrusion throat.

*17. An automatically controlled apparatus for produc-*

*ing an extrusion of predetermined cross-section during a controlled extrusion cycle comprising in combination an extrusion chamber for containing extrusion material, an extrusion die defining a portion of the wall of said chamber and including an opening in which the extrusion material is formed to shape during extrusion, variable means for controlling the size and shape of the extrusion opening, a prime moving means for moving said material to said die and through said opening, a first controller for operating said variable means according to a predetermined program, a second controller for varying the operating speed of said prime moving means, and means coordinating operation of said controllers to produce an extrusion whose shape varies along its length in a predetermined manner.*

*18. An automatically controlled apparatus for producing an extrusion during a program controlled extrusion cycle comprising in combination an extrusion chamber for containing extrusion material, an extrusion die defining a portion of the wall of said chamber and including an opening in which the extrusion material is formed to shape during extrusion, a prime moving means for moving the extrusion material to said die and through said opening, servo means operatively connected to said prime moving means a controller means operatively connected to said servo means for controlling the rate of operation of said prime moving means thereby predetermining the rate of movement of said extrusion material through said chamber, variable controls for said controller means, programming means connected to opertae said variable controls, said programming means including means for generating a predetermined programmed sequence defining an extrusion cycle extending over a predetermined time interval, means presenting said program to said variable controls in a predetermined order for sequentially controlling the operation of said*

*prime moving means to effect a predetermined time varying flow of said material through the extrusion die opening, means for storing said predetermined programmed sequence for repeating said predetermined extrusion cycle during a subsequent time interval.*

References Cited in the file of this patent or the original patent

UNITED STATES PATENTS

| | | |
|---|---|---|
| 1,063,071 | Schleuning | May 27, 1913 |
| 1,411,170 | Kahr | Mar. 28, 1922 |
| 1,482,015 | Kielberg | Jan. 29, 1924 |
| 1,974,618 | Lent | Sept. 25, 1934 |
| 2,015,681 | Kesty | Oct. 1, 1935 |
| 2,044,961 | Waner | June 23, 1936 |
| 2,063,013 | Cooper | Dec. 8, 1936 |
| 2,366,417 | MacMillin | Jan. 2, 1945 |
| 2,411,971 | MacMillin et al. | Dec. 3, 1946 |
| 2,435,643 | Bean | Feb. 10, 1948 |
| 2,485,523 | Ashbaugh | Oct. 18, 1949 |
| 2,497,724 | Gilson et al. | Feb. 14, 1950 |
| 2,580,787 | Johnson | Jan. 1, 1952 |
| 2,615,203 | Dupree | Oct. 28, 1952 |
| 2,615,658 | Young | Oct. 28, 1952 |
| 2,632,202 | Haines | Mar. 24, 1953 |
| 2,683,899 | Reichenbach | July 20, 1954 |
| 2,747,222 | Koch et al. | May 29, 1956 |
| 2,747,224 | Koch et al. | May 29, 1956 |
| 2,750,625 | Colombo | June 19, 1956 |
| 2,778,493 | Kreidler | Jan. 22, 1957 |
| 2,780,835 | Sherman | Feb. 12, 1957 |
| 2,834,983 | Morton | May 20, 1958 |
| 2,903,130 | Reichl | Sept. 8, 1959 |
| 2,916,792 | Crook et al. | Dec. 15, 1959 |
| 2,919,467 | Mercer | Jan. 5, 1960 |